(12) United States Patent
Phillips et al.

(10) Patent No.: US 9,166,315 B1
(45) Date of Patent: Oct. 20, 2015

(54) STRADDLE MOUNT CONNECTOR AND PLUGGABLE TRANSCEIVER MODULE HAVING THE SAME

(71) Applicant: Tyco Electronics Corporation, Berwyn, PA (US)

(72) Inventors: Michael John Phillips, Camp Hill, PA (US); Michael David Herring, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/266,761

(22) Filed: Apr. 30, 2014

(51) Int. Cl.
*H01R 12/72* (2011.01)

(52) U.S. Cl.
CPC .................................. *H01R 12/722* (2013.01)

(58) Field of Classification Search
CPC ........... H01R 23/7073; H01R 23/7068; H01R 23/6873
See application file for complete search history.

(56) References Cited

U.S. PATENT DOCUMENTS

| | | | | |
|---|---|---|---|---|
| 5,316,488 A | * | 5/1994 | Gardner et al. ................. | 439/79 |
| 5,322,447 A | * | 6/1994 | Okada ............................. | 439/79 |
| 5,482,474 A | * | 1/1996 | Yohn et al. ..................... | 439/79 |
| 5,584,708 A | * | 12/1996 | Leong ............................. | 439/79 |
| 5,743,751 A | * | 4/1998 | Davis et al. ..................... | 439/79 |
| 5,816,831 A | * | 10/1998 | Clark .............................. | 439/79 |
| 5,975,917 A | * | 11/1999 | Wang et al. ..................... | 439/79 |
| 6,416,335 B1 | | 7/2002 | Horchler | |
| 6,589,061 B1 | * | 7/2003 | Korsunsky et al. ............. | 439/83 |
| 6,695,650 B2 | * | 2/2004 | Mueller ......................... | 439/680 |
| 7,442,055 B2 | | 10/2008 | Robinette | |
| 7,785,140 B2 | * | 8/2010 | Henry ........................ | 439/541.5 |
| 8,123,534 B1 | | 2/2012 | Herring et al. | |
| 8,371,861 B1 | | 2/2013 | Cina et al. | |
| 8,556,658 B2 | | 10/2013 | Szczesny et al. | |
| 8,944,830 B2 | * | 2/2015 | Little et al. ..................... | 439/79 |
| 2003/0171012 A1 | * | 9/2003 | Korsunsky et al. ............. | 439/79 |
| 2010/0178783 A1 | * | 7/2010 | Bright et al. .................... | 439/79 |

\* cited by examiner

*Primary Examiner* — Gary Paumen

(57) ABSTRACT

Straddle mount connector including first and second plug members each having a member housing and electrical contacts held by the member housing. Each of the member housings has a base portion and a mating segment that projects away from the base portion to a distal edge. Each of the mating segments has an inner plug side and an outer plug side that face in respective opposite directions. The mating segments of the first and second plug members are coupled to each other along the inner plug sides and form a common straddle plug that is configured to be inserted in a mating direction into an edge connector. The common straddle plug projects away from a board edge of the circuit board in the mating direction. The electrical contacts of the first and second plug members extend along the outer plug sides of the corresponding mating segments for communicatively engaging the edge connector.

20 Claims, 7 Drawing Sheets

STRADDLE MOUNT CONNECTOR AND PLUGGABLE TRANSCEIVER MODULE HAVING THE SAME

BACKGROUND

The subject matter herein relates generally to straddle mount connectors that electrically interconnect a circuit board and an edge connector, and to pluggable transceiver modules that include straddle mount connectors.

Straddle mount connectors may be used to interconnect a circuit board and an edge connector that may be mounted to another circuit board or other device. In some cases, straddle mount connectors are incorporated with pluggable transceiver modules in which the straddle mount connector is secured to an internal circuit board of the pluggable transceiver module. The straddle mount connector is positioned at a leading end of the pluggable transceiver module such that the straddle mount connector is inserted into a receptacle assembly during a mating operation. The straddle mount connector has a plug portion that is received by and communicatively coupled to the edge connector in the receptacle assembly.

Conventional straddle mount connectors may include a connector housing that forms a slot for receiving an edge of the circuit board to which the straddle mount connector is secured. The connector housing holds a pair of rows of electrical contacts. The rows oppose each other with the slot therebetween such that each row engages a corresponding side of the circuit board when the circuit board is inserted into the slot. More specifically, when the edge of the circuit board is inserted into the slot during a board-insertion process, contact tails of the electrical contacts engage the circuit board. The contact tails slide or wipe along the corresponding side of the circuit board until the contact tails are positioned over corresponding contact pads of the circuit board.

Known straddle mount connectors may have certain drawbacks. For example, the contact tails typically include an added length that curves away from the circuit board. This added length of the contact tail, which may be referred to as the stub portion, reduces the likelihood of the contact tail improperly engaging the edge of the circuit board during the board-insertion process. For instance, the stub portion reduces the likelihood that an end of the contact tail will stub the circuit board during the board-insertion process and be bent or otherwise damaged. The stub portion does not carry a signal when data signals are transmitted through the straddle mount connector, which may negatively affect electrical performance.

In addition to the above, the connector housing of known straddle mount connectors may not be suitable for some applications. The edge of the circuit board that is received by the slot of the connector housing extends along a width of the circuit board between two opposite side edges. The slot of the connector housing extends the entire width and the connector housing surrounds and grips the opposite side edges of the circuit board. As such, the connector housing has a width that is greater than the width of the circuit board, which may render the straddle mount connector unsuitable for certain applications in which smaller components are desired.

Accordingly, a need exists for a straddle mount connector that can be easily mounted on a circuit board, provides good electrical performance, and has a relatively small size.

BRIEF DESCRIPTION

In an embodiment, a straddle mount connector is provided that includes first and second plug members each having a member housing and electrical contacts held by the member housing. Each of the member housings has a base portion and a mating segment that projects away from the base portion to a distal edge. Each of the mating segments has an inner plug side and an outer plug side that face in respective opposite directions. The mating segments of the first and second plug members are coupled to each other along the inner plug sides and form a common straddle plug that is configured to be inserted in a mating direction into an edge connector. The base portions are configured to be coupled to opposite sides of a circuit board such that the circuit board is held between the base portions and the common straddle plug projects away from a board edge of the circuit board in the mating direction. The electrical contacts of the first and second plug members extend along the outer plug sides of the corresponding mating segments for communicatively engaging the edge connector.

In an embodiment, a pluggable transceiver module is provided that includes a module housing having a leading end that is configured to be inserted in a mating direction during a mating operation with an edge connector. The pluggable transceiver module also includes a card assembly that is held by the module housing and includes a circuit board that has opposite first and second sides and a board edge extending between the first and second sides. The card assembly also includes a straddle mount connector that is secured to the circuit board and positioned proximate to the leading end of the module housing. The straddle mount connector includes discrete first and second plug members that are coupled to the first and second sides, respectively, along the board edge of the circuit board. The first and second plug members have respective mating segments that project away from the board edge in the mating direction. The mating segments couple to each other to form a common straddle plug that is received by and communicatively engaged to the edge connector.

DETAILED DESCRIPTION

Embodiments set forth herein include straddle mount connectors and pluggable transceiver modules that include the same. Although the straddle mount connectors are illustrated and described as being incorporated with pluggable transceiver modules, it should be understood that the straddle mount connector may be used in other environments and applications in which it is desired to electrically connect a circuit board to another system or device. For example, the straddle mount connectors may be used with daughter cards that are inserted into an interior of a computing system.

Figure 1:
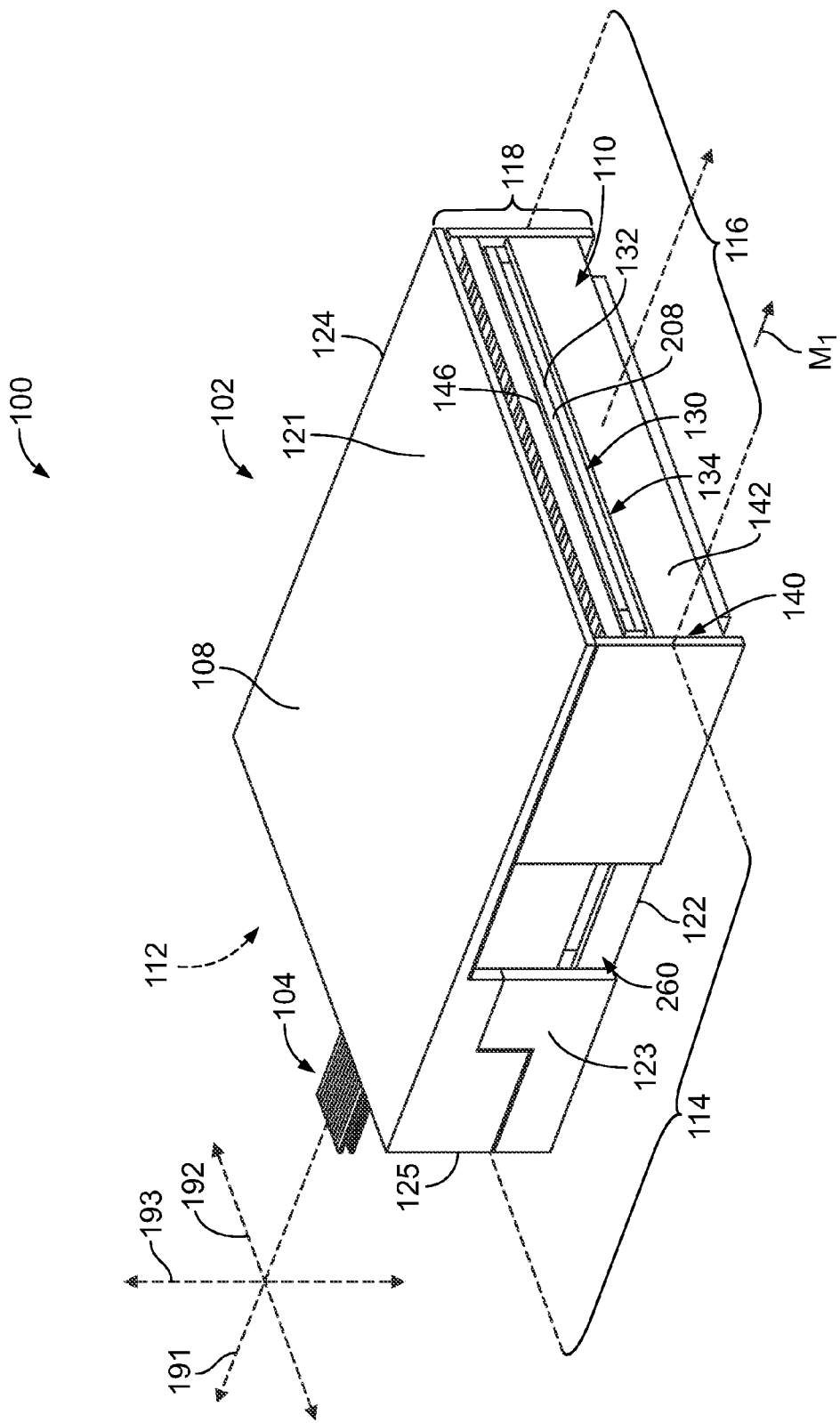
FIG. 1 is a perspective view of a cable assembly that includes a pluggable transceiver module formed in accordance with an embodiment.

FIG. 1 is a perspective view of a cable assembly 100 formed in accordance with an embodiment. The cable assembly 100 includes a pluggable transceiver module 102 and a communication cable 104 that is operably coupled to the pluggable transceiver module 102. As described in greater detail below, the pluggable transceiver module 102 includes a straddle mount connector 208, which is described in greater detail below. The pluggable transceiver module 102 is configured to engage an edge connector 400 (shown in FIG. 10) during a mating operation. The pluggable transceiver module 102 is oriented with respect to mutually perpendicular axes 191, 192, 193, which include a central axis 191, a lateral axis 192, and an elevation axis 193. In some embodiments, the elevation axis 193 may extend parallel to the force of gravity, but it should be understood that embodiments are not required to have any particular orientation with respect to gravity.

The pluggable transceiver module 102 includes a module or connector housing 108 that has a leading end 110 and a trailing end 112. The leading end 110 is configured to mate with or otherwise engage the edge connector 400 (FIG. 10) during the mating operation. In the illustrated embodiment, the trailing end 112 has the communication cable 104 coupled thereto. The communication cable 104 may be permanently attached to the pluggable transceiver module 102 or separably attached to the pluggable transceiver module 102. In the illustrated embodiment, the communication cable 104 includes one or more optical fibers that are configured to transfer data signals to the pluggable transceiver module 102 and/or from the pluggable transceiver module 102. The data signals are in the form of optical signals. In alternative embodiments, the communication cables include insulated wires having jackets that surround wire conductors. The wire conductors may be configured to transfer electrical signals and/or electrical power.

As shown, the central axis 191 extends through an approximate center of the pluggable transceiver module 102 between the leading end 110 and the trailing end 112. The leading end 110 and the trailing end 112 face in opposite directions along the central axis 191. During the mating operation, the leading end 110 is advanced in a mating direction $M_1$ that extends parallel to or coincides with the central axis 191. The leading end 110 may be received by the edge connector 400.

The module housing 108 has a length 114 that extends along the central axis 191, a width 116 that extends along the lateral axis 192, and a height 118 that extends along the elevation axis 193. In the illustrated embodiment, the length 114 is greater than the width 116. The pluggable transceiver module 102, however, may have other configurations. For example, the width 116 may be greater than length 114 in other embodiments.

Also shown in FIG. 1, the module housing 108 includes a plurality of exterior housing sides 121, 122, 123, 124, and 125, which include a first or top body side 121, a second or bottom body side 122, opposite side walls 123, 124, and a back side 125. The side walls 123, 124 face in opposite directions along the lateral axis 192 and extend between the first and second body sides 121, 122. The first and second body sides 121, 122 face in opposite directions along the elevation axis 193 and extend laterally between the side walls 123, 124. The module housing 108 includes a housing cavity 130 and is configured to hold a card assembly 132 within the housing cavity 130. The housing cavity 130 includes a receiving space 134 that is located between the first and second body sides 121, 122 proximate to the leading end 110. As used herein, the phrase "proximate to the leading end" includes being located at the leading end.

Optionally, the pluggable transceiver module 102 includes a guard assembly 140 that is coupled to the module housing 108. Prior to the mating operation, the guard assembly 140 is configured to protect or shield the card assembly 132, which includes the straddle mount connector 208. To this end, the guard assembly 140 includes a protective shroud 142 and a spring member (not shown). The protective shroud 142 is held proximate to the leading end 110 by the spring member when the pluggable transceiver module 102 is unmated with respect to the edge connector 400. The protective shroud 142, however, is permitted to move through the receiving space 134 during the mating operation.

For example, the spring member may be predisposed to hold the protective shroud 142 in a forward position proximate to the leading end 110 when the pluggable transceiver module 102 is unmated with respect to the edge connector 400. The forward position of the protective shroud 142 is shown in FIG. 1. Although the spring member holds the protective shroud 142 in the forward position, the spring member permits the protective shroud 142 to move toward the trailing end 112 to a displaced position during the mating operation. As the protective shroud 142 is moved to the displaced position, the straddle mount connector 208 may move through an edge slot 146 and into the edge connector 400. The protective shroud 142 and the spring member are described in greater detail in U.S. application Ser. No. 14/266,755, which was filed on the same day as the present application and is incorporated herein by reference in its entirety.

In some embodiments, the pluggable transceiver module 102 may be an input/output (I/O) module that is capable of being repeatedly inserted into and removed from the edge connector 400. The pluggable transceiver module 102 may be configured for various applications. Non-limiting examples of such applications include host bus adapters (HBAs), redundant arrays of inexpensive disks (RAIDs), workstations, rack-mount servers, servers, storage racks, high performance computers, or switches. The pluggable transceiver module 102 may be configured for one or more industry standards, such as IEEE 802.3ba, and be capable of transmitting six (6) gigabits per second (Gbps) for each lane or 10 Gbps per lane. In particular embodiments, the pluggable transceiver module 102 may be part of a C form-factor pluggable (CFP) interface that is configured to transmit high speed data signals, such as 40 Gbps, 100 Gbps, or more. In other embodiments, the pluggable transceiver module 102 may be configured to be compliant with small form factor (SFF) industry standards, such as SFF-8644 or SFF-8449 HD.

Figure 2:
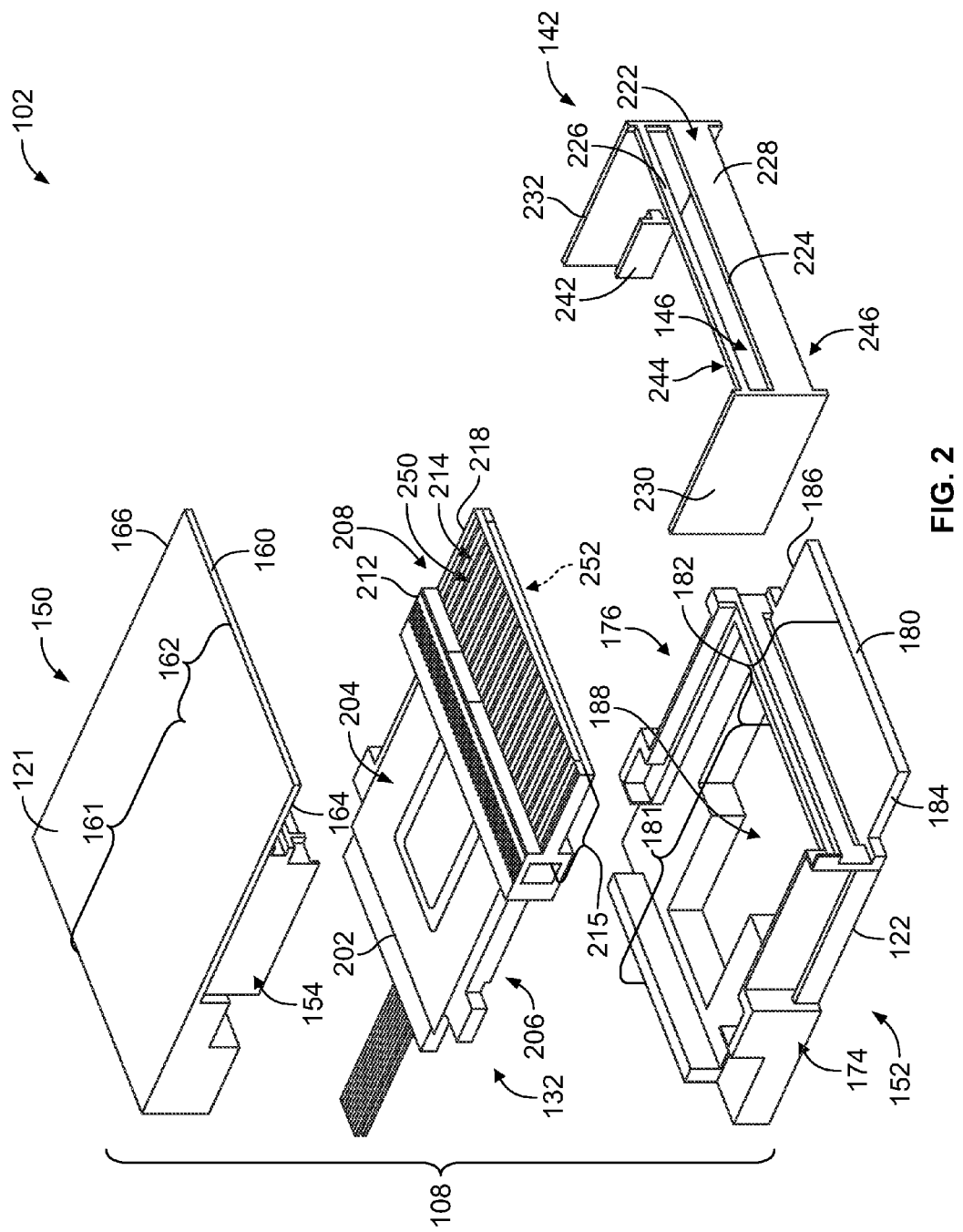
FIG. 2 is a partially exploded view of the pluggable transceiver module of FIG. 1 in accordance with an embodiment.

FIG. 2 is a partially exploded view of the pluggable transceiver module 102. In the illustrated embodiment, the module housing 108 includes first and second housing shells 150, 152. The housing shells 150, 152 are sized and shaped in a complementary manner such that the module housing 108 is formed when the housing shells 150, 152 are combined. The housing shell 150 includes the first body side 121 and wall sections 154 that form part of the side walls 123, 124 (shown in FIG. 1) when the housing shells 150, 152 are coupled together. Only one wall section 154 is shown in FIG. 2, but the laterally opposite side of the housing shell 150 may include a similar wall section. The housing shell 150 includes a front edge 160 that is positioned at the leading end 110 (FIG. 1) when the pluggable transceiver module 102 is fully assembled. In particular embodiments, the housing shell 150 also includes a base portion 161 and a housing extension 162. The base portion 161 may generally interface with the card assembly 132 when the pluggable transceiver module 102 is assembled. The housing extension 162 extends from the base portion 161 to the front edge 160. The housing extension 162 also includes opposite lateral edges 164, 166. The front edge 160 is coupled to and extends between the lateral edges 164, 166.

In a similar manner, the housing shell 152 includes a wall section 174 and an opposite wall section 176. The second body side 122 extends laterally between the wall sections 174, 176. The housing shell 152 defines a front edge 180 that is positioned at the leading end 110 (FIG. 1) when the pluggable transceiver module 102 is fully assembled. In particular embodiments, the second housing shell 152 also includes a base portion 181 and a housing extension 182. The base portion 181 may include the wall sections 174, 176 and generally interface with the card assembly 132 when the pluggable transceiver module 102 is fully assembled. The housing extension 182 extends from the base portion 181 to the front edge 180. The housing extension 182 also includes opposite lateral edges 184, 186. The front edge 180 is coupled to and extends between the lateral edges 184, 186.

When the first and second housing shells 150, 152 are coupled to each other, the housing cavity 130 (FIG. 1) is defined therebetween. In certain embodiments, the receiving space 134 (FIG. 1) is defined between the housing extensions 162, 182, and a remainder of the housing cavity 130 is defined between the base portion 161, 181 of the housing shells 150, 152, respectively. The housing cavity 130 may be formed, at least in part, from corresponding cavity portions or recesses 188 of the housing shells 150, 152. The cavity portion 188 of the housing shell 152 is shown in FIG. 2. When the housing shells 150, 152 are coupled to each other, the cavity portions 188 are combined to form at least a portion of the housing cavity 130. The housing cavity 130 is sized and shaped to hold the card assembly 132 therein.

In the illustrated embodiment, the card assembly 132 includes a circuit board 202 having opposite first and second sides 204, 206 and various communication components that are coupled to the circuit board 202 and operably interconnected to one another. The communication components may include the straddle mount connector 208, one or more processing units 209 (shown in FIG. 3), and an optical engine 210 (shown in FIG. 3). In the illustrated embodiment, the straddle mount connector 208 includes a straddle portion 212 and a common straddle plug 215 that projects from the straddle portion 212.

Figure 10:
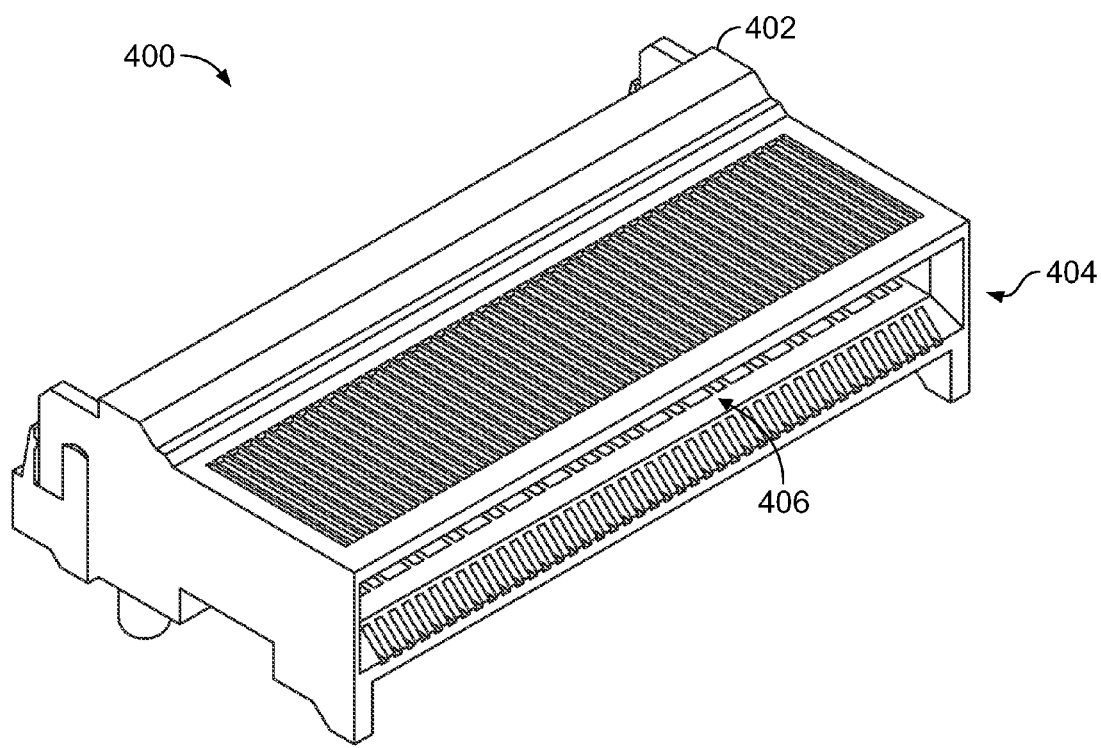
FIG. 10 illustrates an edge connector that may be configured to receive and communicatively engage the straddle mount connector.

The common straddle plug 215 is sized and shaped to be inserted into and communicatively engage with the edge connector 400 (FIG. 10). The common straddle plug 215 has an outer plug side 250 and an outer plug side 252 that face in opposite directions along the elevation axis 193 (FIG. 1). The common straddle plug 215 includes a row 214 of electrical contacts 218 along the outer plug side 250, and a row 216 (shown in FIG. 3) of electrical contacts 220 (shown in FIG. 3) along the outer plug side 252. The rows 214, 216 extend transverse to the central axis 191 (FIG. 1) and parallel to the lateral axis 192 (FIG. 1).

The straddle portion 212 is configured to engage the circuit board 202 such that the straddle mount connector 208 is secured thereto and also electrically engages contact pads 344 (shown in FIG. 7) along the circuit board 202. In certain embodiments, the common straddle plug 215 has dimensions that are similar to an edge of a circuit board. For example, the common straddle plug 215 may be mated with an edge connector that is also capable of directly receiving an edge of a circuit board.

In the illustrated embodiment, the protective shroud 142 includes a front wall 222 having the edge slot 146. The front wall 222 may include an inner edge 224 that defines the edge slot 146. In particular embodiments, the edge slot 146 may be a narrow opening that is defined between a first wall portion 226 and a second wall portion 228. In alternative embodiments, the edge slot 146 may be open-sided. For example, in one alternative embodiment, the first wall portion 226 may be removed such that the edge slot is defined above the second wall portion 228.

The first and second wall portions 226, 228 may be shaped and/or positioned relative to the housing extensions 162, 182, respectively, such that the front wall 222 is permitted to slide within the receiving space 134 (FIG. 1) between the body sides 121, 122. In the illustrated embodiment, the front wall 222 includes a first extension recess 244 along the first wall portion 226 and a second extension recess 246 along the second wall portion 228. The housing extensions 162, 182 are configured to slide through the extension recesses 244, 246, respectively, along the first and second wall portions 226, 228, respectively, during the mating operation.

In certain embodiments, the protective shroud 142 is configured to surround the receiving space 134 (FIG. 1) or wrap about the leading end 110 (FIG. 1). Accordingly, the protective shroud 142 may include shroud sides 230, 232. The front wall 222 is coupled to and extends between the shroud sides 230, 232. When the pluggable transceiver module 102 is fully assembled, the shroud sides 230, 232 may extend substantially parallel to the central axis 191 (FIG. 1). In particular embodiments, the shroud sides 230, 232 include corresponding runners 242. The runners 242 are configured to engage the module housing 108 to guide the protective shroud 142 or the front wall 222 along a designated path. In alternative embodiments, the shroud sides 230, 232 do not include runners. For instance, the shroud sides 230, 232 may be received within corresponding slots or tracks of the module housing 108.

Figure 3:
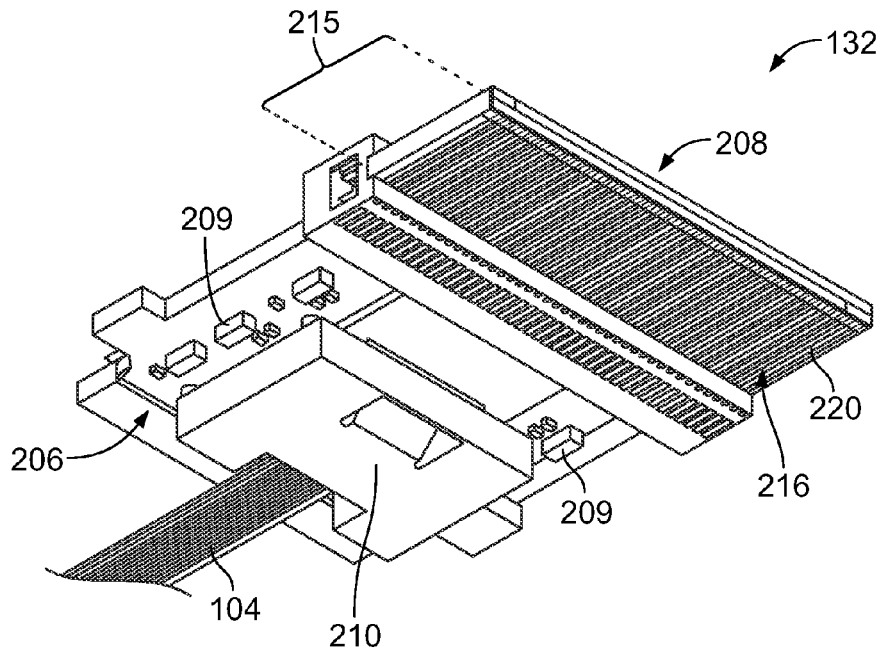
FIG. 3 is a bottom perspective view of a card assembly that may be used with the pluggable transceiver module of FIG. 1.

FIG. 3 is a bottom perspective view of the card assembly 132 that shows the second side 206 of the circuit board 202 having the optical engine 210 and the processing units 209 coupled thereto. One or more of the processing units 209 may constitute chips or other circuitry that is capable of processing data signals to execute one or more functions of the pluggable transceiver module 102 (FIG. 1). The optical engine 210 is coupled to the communication cable 104 and is configured to be positioned within the cavity portion 188 (FIG. 2) of the housing shell 152 (FIG. 2). The optical engine 210 may receive optical signals from the communication cable 104 and convert the optical signals to electrical signals that are then transmitted through the straddle mount connector 208. The optical engine 210 may also receive electrical signals through the straddle mount connector 208 and convert the electrical signals to optical signals that are then transmitted through the communication cable 104. One or more of the processing units 209 may be used to convert the signal form of the data signals and/or modify the data signals to improve signal integrity. The row 216 of electrical contacts 220 along the outer plug side 252 of the common straddle plug 215 is also shown in FIG. 3.

Figure 4:
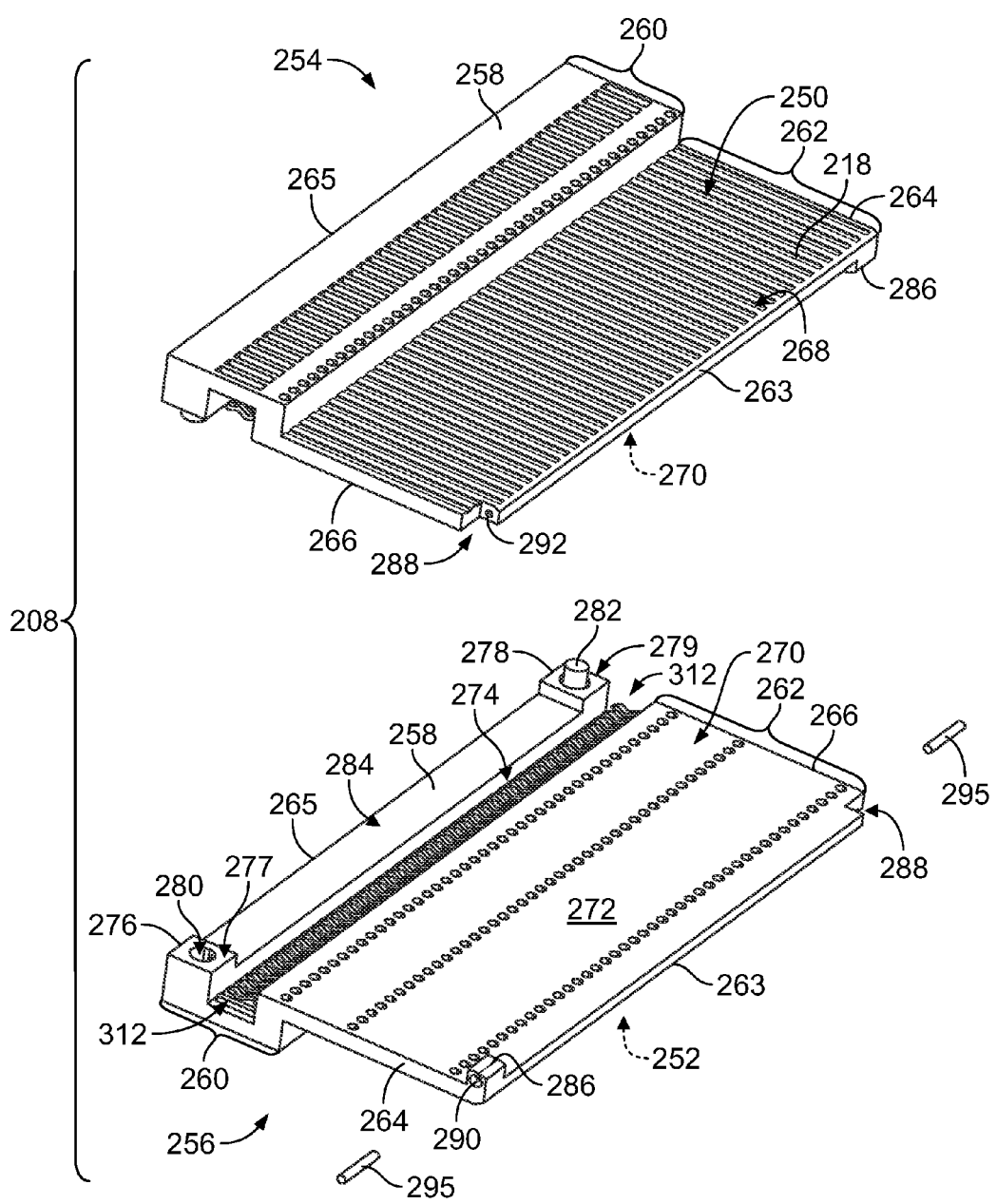
FIG. 4 is a partially exploded view of a straddle mount connector formed in accordance with one embodiment.

FIG. 4 is a partially exploded view of the straddle mount connector 208. The straddle mount connector 208 includes discrete first and second plug members 254, 256 that are configured to couple to the first and second sides 204, 206 (FIG. 2), respectively, of the circuit board 202 (FIG. 2). The first and second plug members 254, 256 may be mounted separately to the corresponding first and second sides 204, 206, respectively. For example, the first plug member 254 may be mounted to the circuit board 202, and the second plug member 256 may be subsequently mounted to the circuit board 202. Although the first and second plug members 254, 256 are discrete or distinct parts of the straddle mount connector 208, the first and second plug members 254, 256 are secured to the circuit board 202 and to each other such that the straddle mount connector 208 is a substantially unitary structure.

The first plug member 254 includes the outer plug side 250, and the second plug member 256 includes the outer plug side 252. In certain embodiments, the first and second plug members 254, 256 are identical. As such, specific features described herein with respect to one plug member may be similarly applied to the other plug member. In other embodiments, the first and second plug members 254, 256 are not identical.

As shown in FIG. 4, each of the first and second plug members 254, 256 includes a member housing 258 that includes a base portion 260 and a mating segment 262 that projects away from the base portion 260. When the first and second plug members 254, 256 are coupled together to form the straddle mount connector 208, the mating segments 262 of the first and second plug members 254, 256 combine to form the common straddle plug 215 (FIG. 2), and the base portions 260 combine to form the straddle portion 212 (FIG. 2). The mating segments 262 include the corresponding outer plug sides 250, 252.

The member housings 258 have a profile that is defined by housing edges 263-266, which include a distal edge 263, opposite side edges 264, 266, and a rear edge 265. The distal edges 263 are configured to face in the mating direction $M_1$ (FIG. 1) when the straddle mount connector 208 is fully assembled. The member housings 258 of the corresponding first and second plug members 254, 256 may include contact channels 268 that extend along the mating direction $M_1$ or parallel to the central axis 191 (FIG. 1). The contact channels 268 extend through the corresponding mating segment 262 of the corresponding member housing 258. The contact channels 268 are open-sided along the outer plug side 250 such that the electrical contacts 218 are exposed to the exterior. In a similar manner, the electrical contacts 220 (FIG. 3) may be exposed along the outer plug side 252.

The member housings 258 form respective inner plug sides 270. As shown with respect to the second plug member 256, the inner plug side 270 includes a segment area 272 that extends along the corresponding mating segment 262 and is substantially planar. Also shown, the base portion 260 includes a channel portion 274. The channel portion 274 is recessed with respect to the segment area 272 and may extend along the lateral axis 192 (FIG. 1). In particular embodiments, the channel portion 274 may be open-ended such that the side edges 264, 266 define lateral openings 312 to the channel portion 274.

The base portion 260 also includes board-engaging structures 276, 278. The base portion 260 may define a slot portion 284 between the board-engaging structures 276, 278. The board-engaging structures 276, 278 are configured to engage the circuit board 202 (FIG. 2) to secure the straddle mount connector 208 to the circuit board 202. In the illustrated embodiment, the board-engaging structures 276, 278 are block-shaped, but other shapes may be used. In some embodiments, the board-engaging structures 276, 278 have level surfaces 277, 279 that are co-planar to the segment area 272. In the illustrated embodiment, the board-engaging structure 276 includes a cavity 280 and the board-engaging structure 278 includes a coupling post 282. The coupling post 282 of one plug member is configured to be inserted into the cavity 280 of the other plug member.

In some embodiments, the first and second plug members 254, 256 are rotatably coupled prior to being secured to the circuit board 202. For example, the first and second plug members 254, 256 may include hinge components 286 and hinge recesses 288. Each of the hinge components 286 has a hole 290, and each of the mating segments 262 has a hole 292 that opens to the hinge recess 288. As described below, the holes 290, 292 are configured to align and receive pins 295 for rotatably coupling the first and second plug members 254, 256. In other embodiments, the first and second plug members are not rotatably coupled. For example, the first and second plug members 254, 256 may be secured to each other and the circuit board 202 using hardware, such as screws or plugs, and/or an adhesive.

Figure 5:
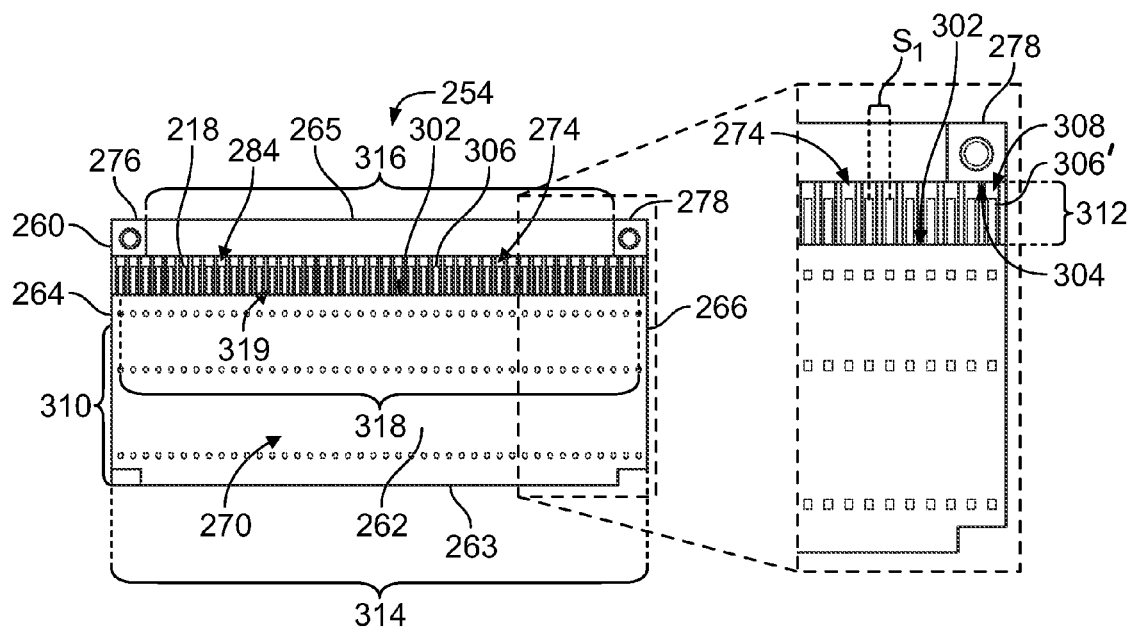
FIG. 5 is a plan view of a plug member that may be used by the straddle mount connector of FIG. 4.

FIG. 5 is a plan view of the inner plug side 270 of the first plug member 254. As described earlier, the first and second plug members 254, 256 (FIG. 4) may be identical in some embodiments. Thus, the following description with respect to the first plug member 254 may also be applied to the second plug member 256. As shown in FIG. 5, the mating segment 262 may extend an insert distance 310 from the base portion 260 to the distal edge 263. The insert distance 310 is sized and shaped for insertion into the edge connector 400 (FIG. 10). Also shown, the first plug member 254 has a member width 314 that extends between the side edges 264, 266. In the illustrated embodiment, the member width 314 is substantially uniform from the rear edge 265 to the distal edge 263. The slot portion 284 of the first plug member 254 has a slot width 316 that extends between the board-engaging structures 276, 278. In the illustrated embodiment, the slot width 316 is less than the member width 314.

In particular embodiments, the electrical contacts 218 are uniformly distributed along the lateral axis 192 (FIG. 1) between the side edges 264, 266. The electrical contacts 218 include contact tails 306 that extend from a back wall 302 of the mating segment 262 into the channel portion 274. The contact tails 306 are configured to directly engage the circuit board 202 (FIG. 2) within the channel portion 274. As shown, the contact tails 306 are positioned side-by-side within the channel portion 274. The contact tails 306 form a channel row 319 having a row width 318 that extends substantially along the entire channel portion 274. The slot width 316 is less than the row width 318.

As shown in the enlarged view in FIG. 5, the channel portion 274 may include a confined region 308 that is defined between the back wall 302 and an opposing structure wall 304 of the board-engaging structure 278. The confined region 308 of the channel portion 274 may extend to the lateral opening 312. As shown, the contact tail 306' is immediately adjacent to the lateral opening 312. Thus, unlike known straddle mount connectors, the electrical contacts 218 may substantially span the entire member width 314, including the confined region 308. Also shown in the enlarged view of FIG. 5, adjacent electrical contacts 218 may have a pitch (or centerline-to-centerline spacing) $S_1$ therebetween. By way of example, the pitch $S_1$ may be less than about 0.5 mm.

Figure 6:
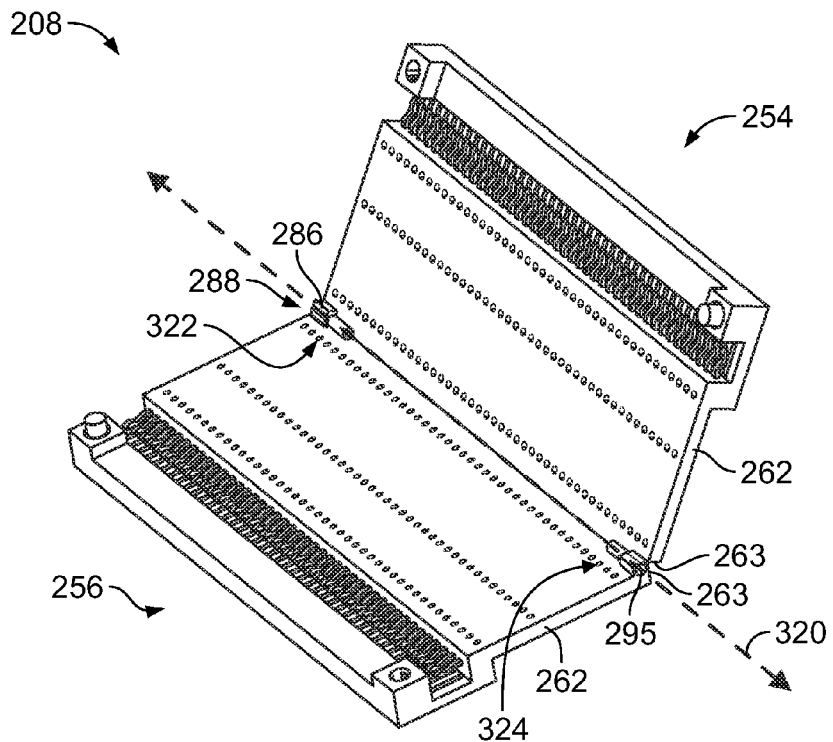
FIG. 6 is a perspective view of the straddle mount connector of FIG. 4 when two plug members are rotatably coupled and in an open position.

FIG. 6 is a perspective view of the straddle mount connector 208 when the first and second plug members 254, 256 are rotatably coupled in an open position. To couple the first and second plug members 254, 256, the distal edges 263 may be positioned adjacent to each other with the hinge component 286 of each plug member 254, 256 being received in the hinge recess 288 of the other plug member. The hole 290 (FIG. 4) of one plug member is aligned with the hole 292 (FIG. 4) of the other plug member to receive a pin 295 therein. Accordingly, the hinge components 286, the holes 290, 292, and the pins 295 form hinge assemblies 322, 324 that rotably couple the first and second plug members 254, 256 on an axis of rotation 320. In an exemplary embodiment, the straddle mount connector 208 includes two hinge assemblies 322, 324 that are located along opposite sides of the straddle mount connector 208. In alternative embodiments, only one hinge assembly may be used.

Yet in other embodiments, however, the first and second plug members 254, 256 are not rotatably coupled. Instead, the first and second plug members 254, 256 may be coupled to each other in other manners. For instance, the first and second plug members 254, 256 may be secured directly to each other using hardware and/or an adhesive. By way of one example only, the mating segments 262 may be secured to each other using a screw or a plug that directly engages each of the mating segments 262. As another example, a cap may engage the distal edges 263 and grip the mating segments 262 together.

Figure 7:
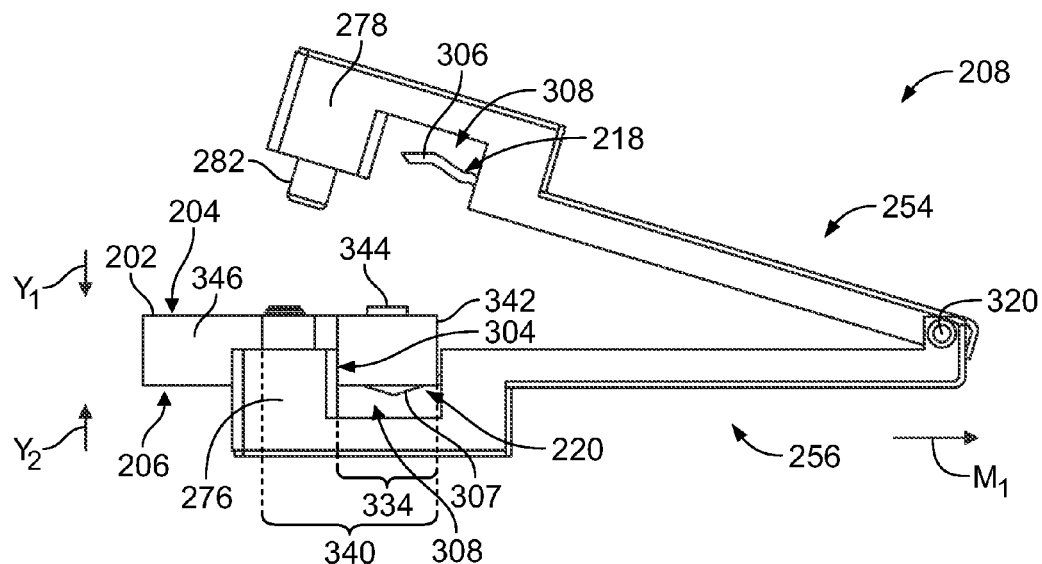
FIG. 7 illustrates an assembly stage for the card assembly of FIG. 3 in which the straddle mount connector of FIG. 4 is secured to a circuit board of the card assembly.

FIG. 7 shows a side view of the straddle mount connector 208 during assembly. The circuit board 202 has an edge portion 340 that includes a board edge 342 of the circuit board 202 and contact pads 344 that are located proximate to the board edge 342 along both of the first and second sides 204, 206. In some embodiments, the circuit board 202 may include board projections or lugs 334 that are sized and shaped to be received within the confined regions 308 of the first and second plug members 254, 256. Only one board projection 334 is shown in FIG. 7 along a side edge 346 of the circuit board 202, but the circuit board 202 may have another board projection 334 along the opposite side edge.

To assemble the straddle mount connector 208, the second plug member 256 may be positioned against the second side 206 along the edge portion 340. As shown, the board projection 334 is disposed within the confined region 308 of the second plug member 256 and the structure wall 304 is engaged with the board projection 334. The first plug member 254 may then be rotated about the axis of rotation 320 such that the coupling post 282 of the board-engaging structure 278 is inserted into the cavity 280 (FIG. 4) of the board-engaging structure 276. The coupling post 282 may form an interference fit with the board-engaging structure 276 such that the first and second plug members 254, 256 are secured to each other.

Accordingly, unlike known straddle mount connectors in which the board edge is inserted into the board slot in the mating direction $M_1$, the first and second plug members 254, 256 may approach the sides 204, 206, respectively, in mounting directions $Y_1, Y_2$, respectively. The mounting directions $Y_1, Y_2$ may be substantially transverse to the mating direction $M_1$.

As shown, the electrical contacts 220 include contact tails 307 that oppose the contact tails 306. When the first plug member 254 and/or the second plug member 256 is coupled to the edge portion 340, the contact tails 306, 307 directly engage the corresponding contact pads 344. Before or after the first plug member 254 is rotated into position against the edge portion 340, the contact tails 307 of the electrical contacts 220 may be permanently coupled to the corresponding contact pads 344 along the second side 206 through, for example, soldering, welding, or another terminating process. The contact tails 306 of the electrical contacts 218 may be subsequently coupled to the corresponding contact pads 344 along the first side 204 in a similar manner. In other embodiments, the contact tails 306, 307 of the electrical contacts 218, 220 may be simultaneously coupled to the contact pads 344. In alternative embodiments, the contact tails 306, 307 are not permanently coupled to the contact pads 344.

Figure 8:
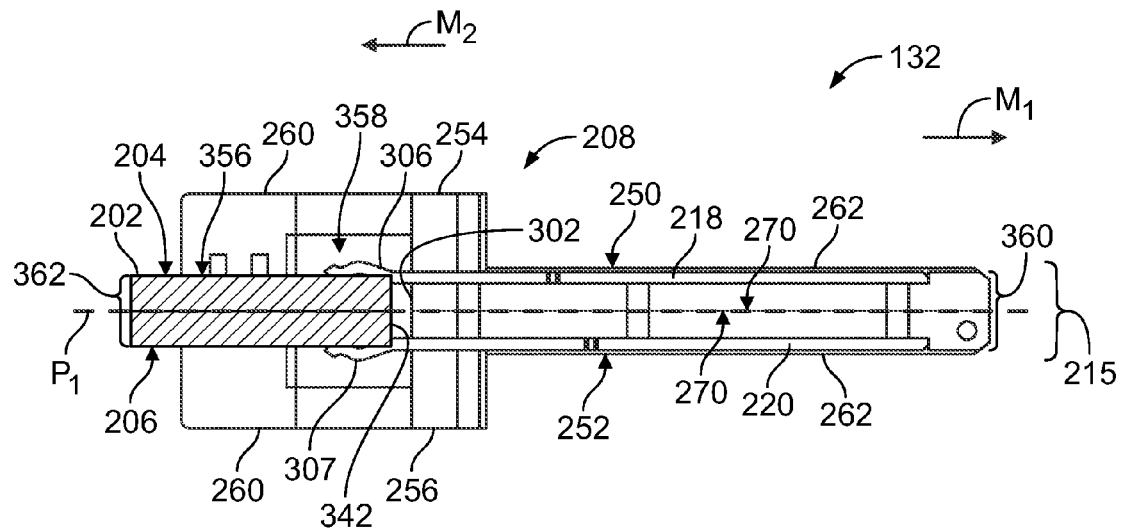
FIG. 8 is a side cross-sectional view of the card assembly.

FIG. 8 is a side cross-sectional view of a portion of the card assembly 132 and illustrates, in particular, the straddle mount connector 208 secured to the circuit board 202. As shown, the first and second plug members 254, 256 are coupled to the first and second sides 204, 206, respectively. More specifically, the base portions 260 are coupled to the corresponding first and second sides 204, 206 such that the circuit board 202 is held between the base portions 260. The mating segments 262 of the first and second plug members 254, 256 are coupled to each other along the inner plug sides 270 and form the common straddle plug 215 that is configured to be inserted into the edge connector 400 (FIG. 10). The common straddle plug 215 projects away from the board edge 342 in the mating direction $M_1$.

The electrical contacts 218, 220 of the first and second plug members 254, 256, respectively, extend along the outer plug sides 250, 252, respectively, of the corresponding mating segments 262 for communicatively engaging the edge connector 400. More specifically, the electrical contacts 218, 220 are exposed along the respective outer plug sides 250, 252 to permit corresponding electrical contacts (not shown) of the edge connector 400 to engage and wipe along the corresponding electrical contacts 218, 220.

When the first and second plug members 254, 256 are coupled to each other and to the circuit board 202 as shown in FIG. 8, the base portions 260 define a board slot 356 and a terminating channel 358 therebetween. The board slot 356 is formed when the slot portions 284 (FIG. 4) of the first and second plug members 254, 256 are overlapped, and the terminating channel 358 is formed when the channel portions 274 (FIG. 4) of the first and second plug members 254, 256 are overlapped. The circuit board 202 extends through the board slot 356 and into the terminating channel 358. The contact tails 306, 307 of the electrical contacts 218, 220, respectively, engage the circuit board 202 in the terminating channel 358. Also shown in FIG. 8, the back walls 302 of the base portions 260 face in a direction $M_2$ that is opposite the mating direction $M_1$. Each of the back walls 302 directly faces the board edge 342. In some cases, the back walls 302 may engage the board edge 342.

The inner plug sides 270 of the mating segments 262 engage each other along an interface plane $P_1$. In some embodiments, the interface plane $P_1$ coincides with the circuit board 202. For example, the interface plane $P_1$ may extend generally between the first and second sides 204, 206. Also shown, the first and second plug members 254, 256 are configured such that the electrical contacts 218, 220 are substantially co-planar with respect to the first and second sides 204, 206, respectively. In some embodiments, a combined thickness 360 of the mating segments 262 is substantially equal to a board thickness 362 of the circuit board 202.

Figure 9:
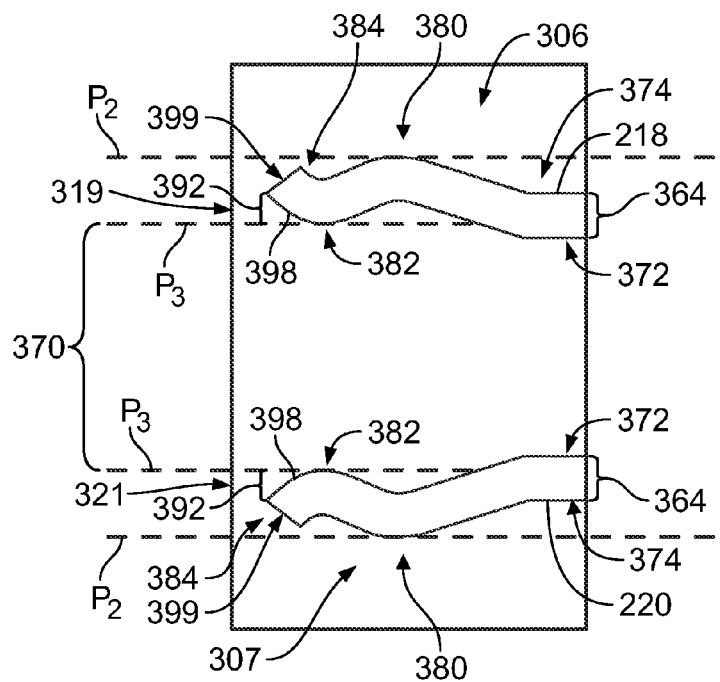
FIG. 9 is an isolated side view of contact tails of electrical contacts that may be used by embodiments set forth herein.

FIG. 9 is an isolated side view of the contact tails 306, 307 of the respective electrical contacts 218, 220 before the circuit board 202 (FIG. 2) is inserted therebetween. The contact tails 306 form the channel row 319, and the contact tails 307 also form a channel row 321 that opposes the channel row 319. The channel rows 319, 321 of the contact tails 306, 307, respectively, oppose each other with a board-receiving space 370 therebetween. In some embodiments, the board-receiving space 370 is approximately equal to or less than the combined thickness 360 (FIG. 8) of the mating segments 262 (FIG. 4).

Also shown in FIG. 9, each of the electrical contacts 218, 220 may include opposite contact surfaces 372, 374 with a contact thickness 364 therebetween. The contact surface 372 is configured to face the circuit board 202 along the corresponding contact tail, and the contact surface 374 is configured to engage the edge connector 400 (FIG. 10) along the corresponding outer plug side. In particular embodiments, the contact tails 306, 307 are shaped to have a terminating joint 380, a contact interface 382, and a stub portion 384. The contact interface 382 is configured to directly engage the corresponding contact pad 344 (FIG. 7). The terminating joint 380 is shaped to provide a resilient force such that the contact interface 382 is biased against the contact pad 344.

In some embodiments, the stub portion 384 is a nominal (or negligible) stub portion. More specifically, the stub portion 384 may have a negligible length 398 that is measured from the corresponding contact interface 382 to an edge 399 of the stub portion 384. The length 398 is indicated in bold along the contact surface 372. For example, the length 398 may be at most 0.25 mm.

Unlike known straddle mount connectors in which the stub portion is intentionally extended and shaped in order to reduce the likelihood of stubbing during a board-insertion process, the stub portion 384 may be substantially shorter than the known stub portions. For example, a plane $P_2$ may intersect a tangent point of the contact surface 374 at the terminating joint 380. In particular embodiments, the stub portion 384 does not clear the plane $P_2$. As another example, a plane $P_3$ may intersect the contact surface 372 at a tangent point of the contact interface 382. Although the contact surface 372 along the stub portion 384 may curve away from the plane $P_3$, a maximum separation distance 392 of the contact surface 372 from the plane $P_3$ at the stub portion 384 may be less than or approximately equal to the contact thickness 364. The nominal stub portion 384 may improve an electrical performance of the corresponding electrical contact compared to other known electrical contacts that have extended stub portions.

FIG. 10 illustrates the edge connector 400 that may engage the straddle mount connector 208 (FIG. 1) during a mating operation. Although not shown, the edge connector 400 may be positioned within a cavity of a receptacle cage. The receptacle cage may guide the leading end 110 (FIG. 1) of the module housing 108 (FIG. 1). In some embodiments, the edge connector 400 is mounted to a circuit board (not shown). The edge connector 400 includes a connector housing 402 having a front side 404 that defines a plug-receiving slot 406. The plug-receiving slot 406 is sized and shaped to receive the common straddle plug 215 (FIG. 2) during the mating operation. In one embodiment, the front side 404 is configured to face in a direction that is parallel to a surface of the circuit board to which the edge connector 400 is mounted. In other embodiments, the front side 404 may face away from the surface of the circuit board.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

What is claimed is:

1. A straddle mount connector comprising:
first and second plug members each having a member housing and electrical contacts held by the member housing, each of the member housings having a base portion and a mating segment that projects away from the base portion to a distal edge, each of the mating segments having an inner plug side and an outer plug side that face in respective opposite directions;
wherein the mating segments of the first and second plug members are coupled to each other along the inner plug sides and form a common straddle plug that is configured to be inserted in a mating direction into an edge connector, the base portions configured to be coupled to opposite sides of a circuit board such that the circuit board is held between the base portions and the common straddle plug projects away from a board edge of the circuit board in the mating direction, the electrical contacts of the first and second plug members extending along the outer plug sides of the corresponding mating segments for communicatively engaging the edge connector.

2. The straddle mount connector of claim 1, wherein the electrical contacts of the first and second plug members have contact tails that are configured to directly engage the circuit board proximate to the board edge.

3. The straddle mount connector of claim 2, wherein the contact tails have nominal stub portions.

4. The straddle mount connector of claim 2, wherein the contact tails are positioned side-by-side to form a channel row that extends transverse to the mating direction, the channel row having a row width, wherein the base portions define a board slot and a terminating channel therebetween, the circuit board configured to extend through the board slot and into the terminating channel where the contact tails engage the circuit board, the board slot having a slot width that is less than the row width.

5. The straddle mount connector of claim 1, wherein the electrical contacts of the first plug member are substantially co-planar with respect to the corresponding side of the circuit board that the first plug member is coupled to, and the electrical contacts of the second plug member are substantially co-planar with respect to the corresponding side of the circuit board that the second plug member is coupled to.

6. The straddle mount connector of claim 1, wherein the electrical contacts of the first plug member include contact tails that form a first channel row along the corresponding base portion, the electrical contacts of the second plug member including contact tails that form a second channel row along the corresponding base portion, the first and second channel rows opposing each other with a board-receiving space therebetween, the board-receiving space being approximately equal to or less than a combined thickness of the mating segments.

7. The straddle mount connector of claim 1, wherein the mating segments are coupled to each other proximate to the distal edges.

8. The straddle mount connector of claim 7, wherein at least one of the mating segments has a hinge component proximate to the corresponding distal edge, the hinge component being coupled to the other mating segment such that the first and second plug members are rotatably coupled to each other.

9. The straddle mount connector of claim 1, wherein the inner plug sides of the mating segments are configured to engage each other along an interface plane when the straddle mount connector is coupled to the circuit board, the interface plane coinciding with the circuit board.

10. The straddle mount connector of claim 1, wherein each of the base portions includes a back wall that faces in a direction that is opposite the mating direction, each of the back walls configured to directly face the board edge of the circuit board when the straddle mount connector is coupled to the circuit board.

11. The straddle mount connector of claim 1, wherein the first and second plug members are configured to be mounted separately to the corresponding sides of the circuit board.

12. A pluggable transceiver module comprising:
a module housing having a leading end that is configured to be inserted in a mating direction during a mating operation with an edge connector; and
a card assembly held by the module housing and comprising a circuit board that has opposite first and second sides and a board edge extending between the first and second sides, the card assembly also including a straddle mount connector that is secured to the circuit board and positioned proximate to the leading end of the module housing, the straddle mount connector including discrete first and second plug members that are coupled to the first and second sides, respectively, along the board edge of the circuit board, the first and second plug members having respective mating segments that project away from the board edge in the mating direction, the mating segments coupling to each other to form a common straddle plug that is received by and communicatively engaged to the edge connector.

13. The pluggable transceiver module of claim 12, wherein the first and second plug members have corresponding electrical contacts with contact tails that directly engage the circuit board proximate to the board edge, the contact tails having nominal stub portions.

14. The pluggable transceiver module of claim 12, wherein the mating segments extend in the mating direction to corresponding distal edges, the mating segments being coupled to each other proximate to the distal edges.

15. The pluggable transceiver module of claim 14, wherein at least one the mating segments has a hinge component proximate to the corresponding distal edge, the hinge component being coupled to the other mating segment such that the first and second plug members are rotatably coupled to each other.

16. The pluggable transceiver module of claim 12, wherein the mating segments include inner plug sides that face and directly engage each other along an interface plane, the interface plane coinciding with the circuit board.

17. The pluggable transceiver module of claim 12, wherein the first and second plug members have corresponding electrical contacts that are configured to engage the edge connector, the electrical contacts of the first plug member being substantially co-planar with the first side of the circuit board, the electrical contacts of the second plug member being substantially co-planar with the second side of the circuit board.

18. The pluggable transceiver module of claim 17, wherein each of the mating segments has an inner plug side and an outer plug side that face in opposite directions, the electrical contacts of the first and second plug members being exposed along the corresponding outer plug sides, the inner plug sides engaging each other.

19. The pluggable transceiver module of claim 12, wherein the mating segments have a combined thickness that is substantially equal to a thickness of the circuit board.

20. The pluggable transceiver module of claim 12, further comprising a communication cable that is communicatively coupled to the straddle mount connector through the circuit board.

* * * * *